(12) United States Patent
Kim et al.

(10) Patent No.: US 12,417,776 B2
(45) Date of Patent: Sep. 16, 2025

(54) ONLINE SPEAKER DIARIZATION USING LOCAL AND GLOBAL CLUSTERING

(71) Applicant: Samsung Electronics Co., Ltd., Suwon-si (KR)

(72) Inventors: Myungjong Kim, Milpitas, CA (US); Taeyeon Ki, Milpitas, CA (US); Vijendra Raj Apsingekar, San Jose, CA (US); Sungjae Park, Seoul (KR); SeungBeom Ryu, Suwon (KR); Hyuk Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 18/046,041

(22) Filed: Oct. 12, 2022

(65) Prior Publication Data

US 2023/0419979 A1   Dec. 28, 2023

Related U.S. Application Data

(60) Provisional application No. 63/356,259, filed on Jun. 28, 2022.

(51) Int. Cl.
*G10L 21/00*   (2013.01)
*G10L 17/02*   (2013.01)
(Continued)

(52) U.S. Cl.
CPC ............ *G10L 21/028* (2013.01); *G10L 17/02* (2013.01); *G10L 17/06* (2013.01)

(58) Field of Classification Search
CPC ....... G10L 21/028; G10L 17/02; G10L 17/06; G10L 25/78; G10L 17/08; G10L 17/04;
(Continued)

(56) References Cited

U.S. PATENT DOCUMENTS 10,468,031 B2   11/2019   Church et al.
11,024,291 B2    6/2021   Castan Lavilla et al.
(Continued)

FOREIGN PATENT DOCUMENTS

CN   113571090 A   10/2021
EP    1669980 B1    4/2009
(Continued)

OTHER PUBLICATIONS

J. M. Coria, H. Bredin, S. Ghannay and S. Rosset, "Overlap-Aware Low-Latency Online Speaker Diarization Based on End-to-End Local Segmentation," 2021 IEEE Automatic Speech Recognition and Understanding Workshop (ASRU), Cartagena, Colombia, 2021, pp. 1139-1146. (Year: 2021).*

(Continued)

*Primary Examiner* — Edgar X Guerra-Erazo (57) ABSTRACT

A method includes obtaining at least a portion of an audio stream containing speech activity. At least the portion of the audio stream includes multiple segments. The method also includes, for each of the segments, generating an embedding vector that represents the segment. The method further includes, within each of multiple local windows, clustering the embedding vectors into one or more clusters to perform speaker identification. Different clusters correspond to different speakers. The method also includes presenting at least one first sequence of speaker identities based on the speaker identification for the local windows. The method further includes, within each of multiple global windows, clustering the embedding vectors into one or more clusters to perform speaker identification. Each global window includes two or more of the local windows. The method further includes presenting at least one second sequence of speaker identities based on the speaker identification for the global windows.

20 Claims, 6 Drawing Sheets

(51) Int. Cl.
*G10L 17/06* (2013.01)
*G10L 21/028* (2013.01)

(58) Field of Classification Search
CPC ......... G10L 17/00; G10L 15/00; G10L 15/08; G10L 15/10; G10L 15/14; G10L 15/16; G10L 15/22; G10L 2015/221; G10L 2015/223; G10L 2015/225; G10L 15/222; G10L 17/10; G10L 17/12; G10L 17/14; G10L 17/16; G10L 17/18; G10L 17/20; G10L 19/02; G10L 19/022; G10L 19/025; G10L 19/028; G10L 19/03; G10L 21/02; G10L 25/03; G10L 25/18; G10L 25/21; G10L 25/24; G10L 25/15; G10L 25/30; G10L 25/33; G10L 25/45; G10L 25/51; G10L 2025/783; G10L 2025/786; G10L 2025/937; G10L 2025/935; G10L 2025/932; G10L 25/93; G10L 2021/02087; G10L 21/0232; G10L 21/0224; G10L 2021/02168; G10L 21/0264; G10L 21/0272; G10L 21/0308; G06N 20/10; G06N 20/00; G06N 20/20; G06N 3/045; G06N 3/02; G06N 7/00; G06N 7/01; G06N 3/0464; G06N 3/0463; G06N 3/047; G06N 3/0475; G06N 3/048; G06N 3/08; G06N 3/082; G06N 3/084; G06N 3/088; G06N 3/0895; G06N 3/09; G06N 3/091; G06N 3/092; G06N 3/094; G06N 3/096; G06N 3/098; G06N 3/0985
See application file for complete search history.

(56) References Cited

U.S. PATENT DOCUMENTS

| | | | |
|---|---|---|---|
| 11,152,013 | B2 | 10/2021 | Song et al. |
| 11,227,605 | B2 | 1/2022 | Grancharov et al. |
| 2019/0340944 | A1 | 11/2019 | Liu et al. |
| 2020/0135204 | A1 | 4/2020 | Robichaud et al. |
| 2020/0302939 | A1 | 9/2020 | Khoury et al. |
| 2022/0115020 | A1 | 4/2022 | Bradley et al. |
| 2022/0122615 | A1 | 4/2022 | Chen et al. |
| 2022/0199091 | A1* | 6/2022 | Kanda ..................... G10L 17/02 |
| 2023/0089308 | A1* | 3/2023 | Wang ..................... G10L 15/063 |
| | | | 704/232 |

FOREIGN PATENT DOCUMENTS

| | | |
|---|---|---|
| KR | 10-2021-0149336 A | 12/2021 |
| WO | 2021026617 A1 | 2/2021 |
| WO | 2021225403 A1 | 11/2021 |

OTHER PUBLICATIONS

Xia et al., "Turn-to-Diarize: Online Speaker Diarization Constrained by Transformer Transducer Speaker Turn Detection," 2022 IEEE International Conference on Acoustics, Speech and Signal Processing, Jan. 2022, 8 pages.

Han et al., "BW-EDA-EEND: Streaming End-to-End Neural Speaker Diarization for a Variable No. of Speakers," 2021 IEEE International Conference on Acoustics, Speech and Signal Processing, Feb. 2021, 5 pages.

Zhang et al., "Fully Supervised Speaker Diarization," 2019 IEEE International Conference on Acoustics, Speech and Signal Processing, Feb. 2019, 5 pages.

Zhang et al., "Low-Latency Online Speaker Diarization with Graph-Based Label Generation," Speaker and Language Recognition Workshop (Odyssey 2022), Jun. 2022, 8 pages.

International Search Report and Written Opinion of the International Searching Authority dated Aug. 30, 2023 in connection with International Patent Application No. PCT/KR2023/007432, 10 pages.

Lu et al., "SCAN: Learning Speaker Identity from Noisy Sensor Data," Proceedings of the 16th ACM/IEEE International Conference on Information Processing in Sensor Networks, Apr. 2017, 12 pages.

Supplementary European Search Report dated Feb. 3, 2025 in connection with European Patent Application No. 23831747.3, 9 pages.

Wang et al., "Speaker Diarization with LSTM," arXiv:1710.10468v7 [eess.AS], Jan. 2022, 5 pages.

\* cited by examiner

FIG. 7

ONLINE SPEAKER DIARIZATION USING LOCAL AND GLOBAL CLUSTERING

CROSS-REFERENCE TO RELATED APPLICATION AND PRIORITY CLAIM

This application claims priority under 35 U.S.C. § 119(e) to U.S. Provisional Patent Application No. 63/356,259 filed on Jun. 28, 2022. This provisional application is hereby incorporated by reference in its entirety.

TECHNICAL FIELD

This disclosure relates generally to machine learning systems. More specifically, this disclosure relates to online speaker diarization using local and global clustering.

BACKGROUND

Speaker diarization refers to the process of identifying or labeling different speakers in an audio stream, and speaker diarization is often used to identify "who spoke when" in a multi-speaker conversation setting. Speaker diarization has received a good deal of attention recently due to its potential in a variety of applications, such as meeting conversation analysis and multimedia information retrieval. As a particular example, for meeting conversation analysis, speaker diarization could potentially be used as a front-end component of automatic speech recognition (ASR), thereby providing improved ASR accuracy and more rich analysis depending on the speakers.

SUMMARY

This disclosure relates to online speaker diarization using local and global clustering.

In a first embodiment, a method for performing online speaker diarization includes obtaining at least a portion of an audio stream containing speech activity, where at least the portion of the audio stream includes multiple segments. The method also includes, for each of the multiple segments, generating an embedding vector that represents the segment. The method further includes, within each of multiple local windows, clustering the embedding vectors into one or more clusters to perform speaker identification, where different clusters correspond to different speakers. The method also includes presenting at least one first sequence of speaker identities based on the speaker identification performed for the local windows. The method further includes, within each of multiple global windows, clustering the embedding vectors into one or more clusters to perform speaker identification, where each global window includes two or more of the local windows. In addition, the method includes presenting at least one second sequence of speaker identities based on the speaker identification performed for the global windows.

In a second embodiment, an apparatus includes at least one processing device configured to obtain at least a portion of an audio stream containing speech activity, where at least the portion of the audio stream includes multiple segments. The at least one processing device is also configured, for each of the multiple segments, to generate an embedding vector that represents the segment. The at least one processing device is further configured, within each of multiple local windows, to cluster the embedding vectors into one or more clusters to perform speaker identification, where different clusters correspond to different speakers. The at least one processing device is also configured to initiate presentation of at least one first sequence of speaker identities based on the speaker identification performed for the local windows. The at least one processing device is further configured, within each of multiple global windows, to cluster the embedding vectors into one or more clusters to perform speaker identification, where each global window includes two or more of the local windows. In addition, the at least one processing device is configured initiate presentation of at least one second sequence of speaker identities based on the speaker identification performed for the global windows.

In a third embodiment, a non-transitory computer readable medium contains instructions that when executed cause at least one processor to obtain at least a portion of an audio stream containing speech activity, where at least the portion of the audio stream includes multiple segments. The non-transitory computer readable medium also contains instructions that when executed cause the at least one processor, for each of the multiple segments, to generate an embedding vector that represents the segment. The non-transitory computer readable medium further contains instructions that when executed cause the at least one processor, within each of multiple local windows, to cluster the embedding vectors into one or more clusters to perform speaker identification, where different clusters correspond to different speakers. The non-transitory computer readable medium also contains instructions that when executed cause the at least one processor to initiate presentation of at least one first sequence of speaker identities based on the speaker identification performed for the local windows. The non-transitory computer readable medium further contains instructions that when executed cause the at least one processor, within each of multiple global windows, to cluster the embedding vectors into one or more clusters to perform speaker identification, where each global window includes two or more of the local windows. In addition, the non-transitory computer readable medium contains instructions that when executed cause the at least one processor initiate presentation of at least one second sequence of speaker identities based on the speaker identification performed for the global windows.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 7, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, speaker diarization refers to the process of identifying or labeling different speakers in an audio stream, and speaker diarization is often used to identify "who spoke when" in a multi-speaker conversation setting. Speaker diarization has received a good deal of attention recently due to its potential in a variety of applications, such as meeting conversation analysis and multimedia information retrieval. As a particular example, for meeting conversation analysis, speaker diarization could potentially be used as a front-end component of automatic speech recognition (ASR), thereby providing improved ASR accuracy and more rich analysis depending on the speakers.

Various approaches have been developed for performing speaker diarization in an offline or non-real-time fashion. These approaches typically process representations of audio data once an entire audio recording is available, which means these approaches cannot be used in a real-time or streaming fashion to process audio data as the audio data becomes available. While there are some approaches for performing speaker diarization in an online or real-time fashion, these approaches can suffer from various shortcomings. For instance, online speaker diarization approaches typically have an accuracy that is significantly worse than the accuracy of offline speaker diarization approaches. Also, online speaker diarization approaches often use machine learning models that are trained in a supervised manner, so these machine learning models typically lack flexibility and modularity. Among other things, it is difficult to generalize these machine learning models to arbitrary domains and environments, and it is difficult to maintain these machine learning models after deployment.

This disclosure provides various techniques for online speaker diarization using local and global clustering. As described in more detail below, at least a portion of an audio stream containing speech activity is obtained (such as by performing speech activity detection), and at least the portion of the audio stream is divided into segments (such as segments that are one to one and a half seconds in length). For each segment, an embedding vector that represents the segment is generated, such as by identifying features of the segment. In response to generating a first set of embedding vectors for a first set of segments received during a first global window, the first set of embedding vectors can be clustered into one or more clusters (where different clusters correspond to different speakers) in order to perform speaker identification, and a first sequence of speaker identities based on the speaker identification performed for the first global window is produced and presented. In response to generating a second set of embedding vectors for a second set of segments received during a second global window, the second set of embedding vectors can be clustered in order to perform speaker identification, and a second sequence of speaker identities based on the speaker identification performed for the second global window is produced and presented. The second global window can include and be longer than the first global window. Local clustering can also occur within each global window. For example, local clustering can occur during multiple partially-overlapping local windows within each global window, and each local clustering can involve clustering subsets of the embedding vectors. In addition, timestamps can be used to support consistent identification of the same speakers across different local and global clustering operations.

In this way, the techniques for online speaker diarization described in this disclosure can support multiple levels of clustering. The local clustering can occur in order to satisfy desired latency requirements, since monotonically-increasing chunk-based spectral clustering or other local clustering techniques can be performed more quickly when processing audio data over shorter timespans. The global clustering can occur in order to satisfy desired accuracy requirements, since global-wise spectral clustering or other global clustering techniques can be more accurate when processing audio data over longer timespans. Because of this, the techniques for online speaker diarization described in this disclosure can meet various accuracy and stream-ability requirements as needed or desired in various applications. Overall, the techniques for online speaker diarization described in this disclosure can be used to provide speaker diarization results in real-time, and those results can be much more accurate compared to other online techniques and can possibly be close to or as accurate as offline techniques.

The online speaker diarization techniques described in this disclosure may be used in a large number of possible applications. For example, online transcription applications can involve converting audio data into text-based transcripts in real-time. Meeting conversation analysis applications can involve the processing of audio data associated with meetings or other conversations in order to analyze the conversations. Multimedia information retrieval applications can involve processing multimedia content (such as based on the conversations contained in the multimedia content) and retrieving multimedia content that satisfies user queries. All of these example applications can rely on, use, or be supported by online speaker diarization techniques in order to perform their described functionalities correctly. Of course, the online speaker diarization functionality described in this document may be used in any other suitable manner.

Figure 1:
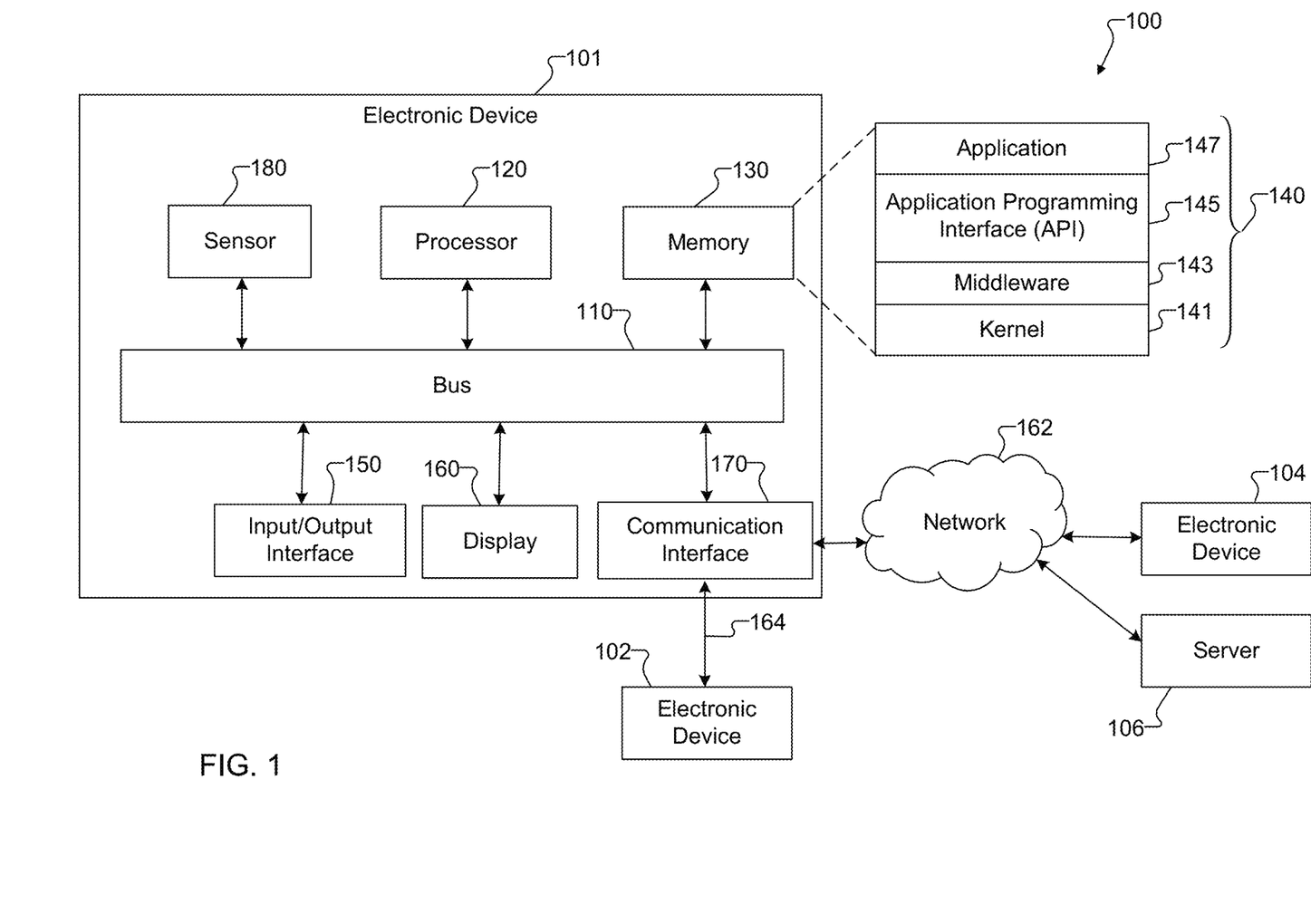
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described below, the processor 120 may be used to perform online speaker diarization.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications related to online speaker diarization. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to perform online speaker diarization.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
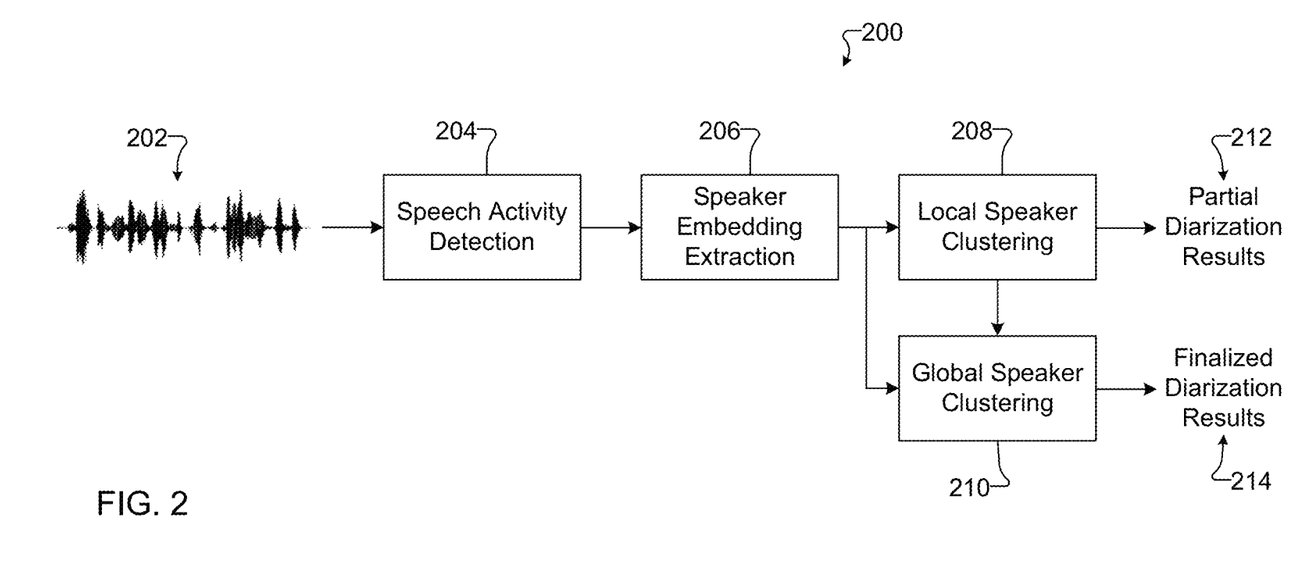
FIG. 2 illustrates an example architecture for online speaker diarization using local clustering and global clustering in accordance with this disclosure.

FIG. 2 illustrates an example architecture 200 for online speaker diarization using local clustering and global clustering in accordance with this disclosure. For ease of explanation, the architecture 200 is described as being used by the electronic device 101, server 106, or other device(s) in the network configuration 100 of FIG. 1. However, the architecture 200 may be used by any other suitable device(s) and in any other suitable system(s).

As shown in FIG. 2, the architecture 200 generally operates to receive and process input audio data 202. The audio data 202 generally includes audio data of multiple people speaking. Often times, the audio data 202 may additionally include other audio data, such as background noise or other non-speech data. The audio data 202 may be obtained from any suitable source(s). In some cases, the audio data 202 may be captured by the electronic device 101, such as when the audio data 202 is captured by at least one microphone (at least one sensor 180) of the electronic device 101. Note that the audio data 202 may or may not be part of a larger set of multimedia content, such as when the audio data 202 is associated with corresponding video data.

The audio data 202 is received at and processed by a speech activity detection function 204, which analyzes the audio data 202 in order to identify portions of the audio data 202 that contain speech activity by one or more speakers. For example, the speech activity detection function 204 may be used to automatically detect frames of the audio data 202 that contain speech activity and to filter out frames of the audio data 202 containing non-speech signals. The frames containing speech activity can also be divided into shorter segments of audio data. Each segment of the audio data 202 may have any suitable duration, such as between one second and one and a half seconds (although other durations are possible). The speech activity detection function 204 may use any suitable technique to identify segments or other portions of the audio data 202 that contain speech activity.

The segments of the audio data 202 containing speech activity are provided to a speaker embedding extraction function 206, which generates embedding vectors that represent the segments of the audio data 202. For example, the embedding vectors may represent features of the audio data 202 that are extracted or otherwise generated by the speaker embedding extraction function 206 and placed into arrays to form the embedding vectors. The features may represent characteristics or other aspects of the audio data 202 that have a bearing on the identification of speakers in the audio data 202. The speaker embedding extraction function 206 may use any suitable technique to extract features or otherwise generate embedding vectors for audio data. In some embodiments, the speaker embedding extraction function 206 represents a machine learning model, such as a convolutional neural network (CNN), deep learning network (DNN), or other machine learning model. Using suitable training data (such as training audio data with known speakers), the machine learning model can be trained to identify which features of the training audio data are relevant to speaker identification, and the trained machine learning model can be used to extract those relevant features from the audio data 202 for use in generating the embedding vectors.

The embedding vectors are provided to a local speaker clustering function 208 and a global speaker clustering function 210. Each speaker clustering function 208 and 210 is configured to cluster the embedding vectors into different clusters, where different clusters correspond to different speakers. For example, each embedding vector can represent features of the segments of the audio data 202 within a feature space, and each speaker clustering function 208 and 210 can identify clusters or groupings of the embedding vectors within the feature space. As a particular example, each speaker clustering function 208 and 210 may use cosine similarities or other measures of similarities to identify groups of the embedding vectors that are more related to each other and less related to embedding vectors of other groups. When the features forming the embedding vectors represent spectral features of the audio data 202, the local speaker clustering function 208 may be said to perform local-wise spectral clustering, and the global speaker clustering function 210 may be said to perform global-wise spectral clustering.

The speaker clustering functions 208 and 210 differ in terms of which embedding vectors are clustered by the clustering functions 208 and 210. For example, the local speaker clustering function 208 can perform speaker identification by clustering embedding vectors that are generated within smaller time windows. In some cases, these smaller time windows (referred to as local windows) may be five minutes in duration, although other durations may be used. The global speaker clustering function 210 can perform speaker identification by clustering embedding vectors that are generated within larger time windows, where the larger time windows include the smaller time windows. In some cases, these larger time windows (referred to as global windows) may have a minimum duration of twenty minutes and may expand in duration as more and more audio data 202 is received, although other durations may be used.

Figure 3:
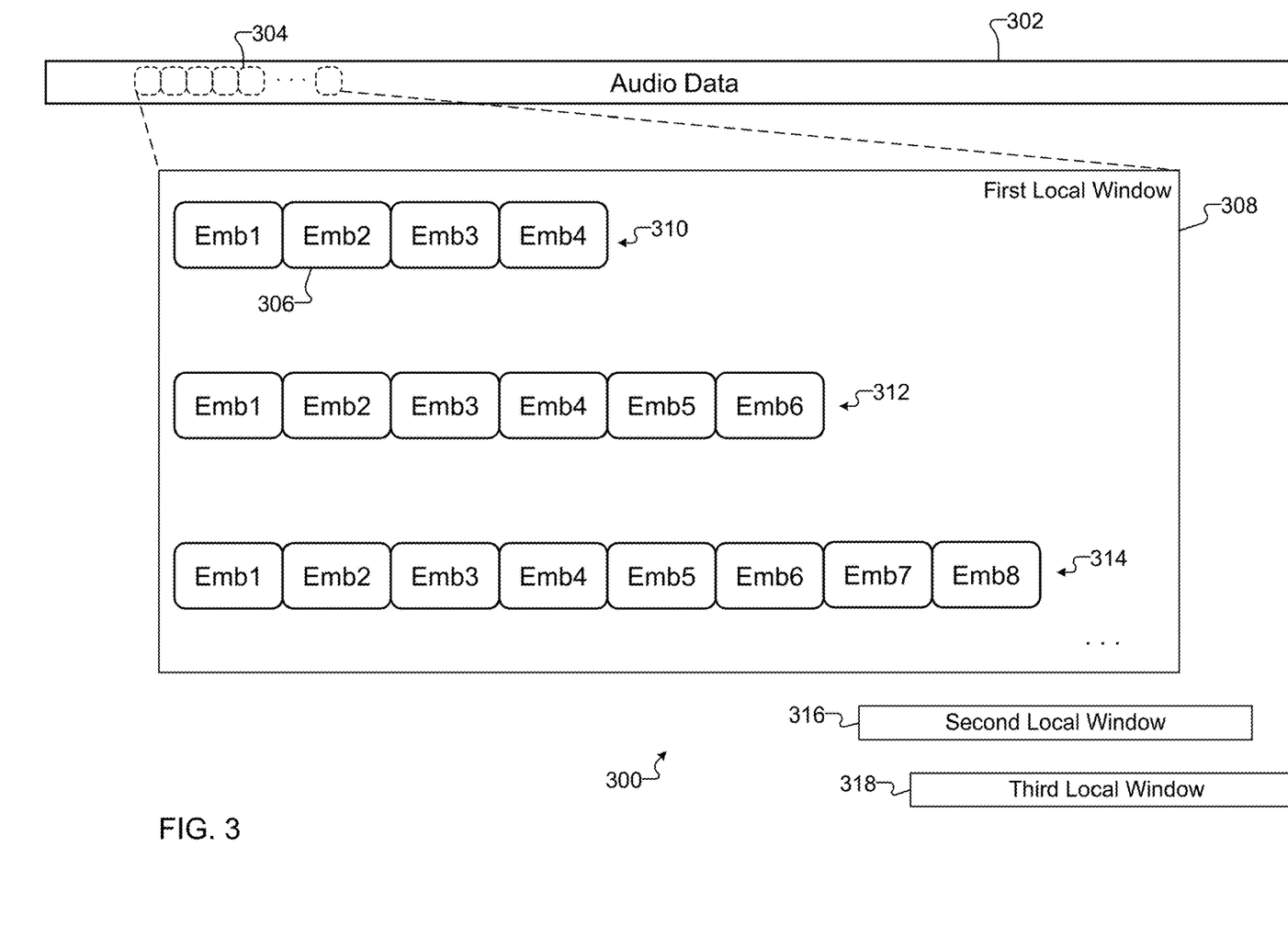
FIG. 3 illustrates an example of local clustering in the architecture of FIG. 2 in accordance with this disclosure.

The local speaker clustering function 208 processes embedding vectors corresponding to the segments of the audio data 202 that are received in smaller local windows of time. In some embodiments, the local speaker clustering function 208 performs monotonically-increasing chunk-based spectral clustering or other local clustering. As described in more detail below, the local speaker clustering function 208 can perform clustering on a first subset of available embedding vectors within a first local window, perform clustering on a second (larger) subset of available embedding vectors within the first local window, and continue until all embedding vectors within the first local window are clustered. The window of time can slide or otherwise move forward to define a second local window, which may overlap with the first local window. The local speaker clustering function 208 can perform clustering on a first subset of available embedding vectors within the second local window, perform clustering on a second (larger) subset of available embedding vectors within the second local window, and continue until all embedding vectors within the second local window are clustered. In some cases, the window of time used by the local speaker clustering function 208 may have a fixed length and may slide forward as more of the audio data 202 is received and converted into embedding vectors over time. One example of this type of approach for local clustering is shown in FIG. 3, which is described in more detail below.

Figure 4:
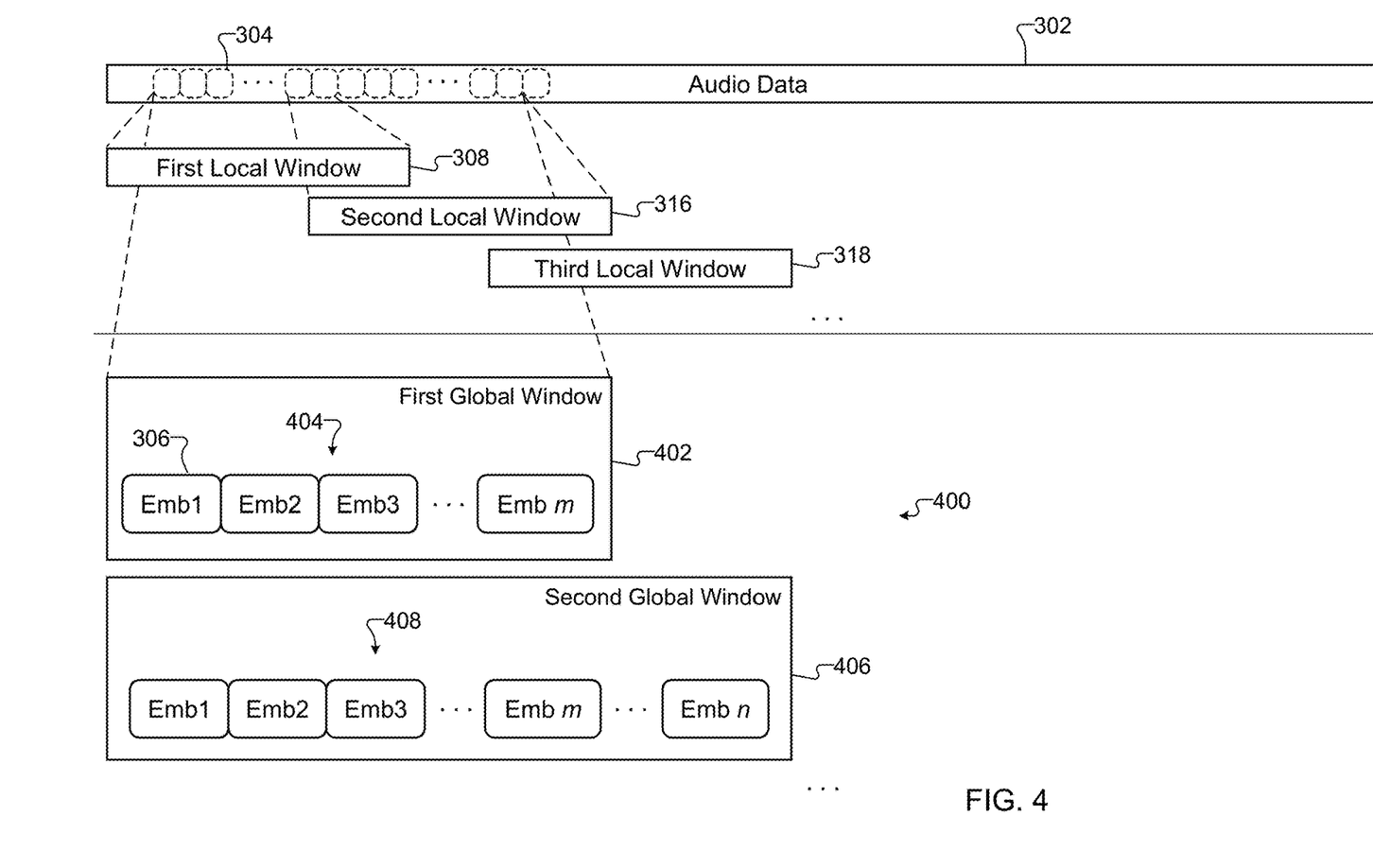
FIG. 4 illustrates an example of global clustering in the architecture of FIG. 2 in accordance with this disclosure.

The global speaker clustering function 210 processes embedding vectors corresponding to the segments of the audio data 202 that are received in larger global windows of time. In some embodiments, the global speaker clustering function 210 performs global-wise spectral clustering or other global clustering. As described in more detail below, the global speaker clustering function 210 can perform clustering in a larger global window of time, and the window of time can expand in duration. In some cases, the window of time used by the global speaker clustering function 210 may initially have a smaller duration, such as a duration that encompasses two (possibly overlapping) local windows, and the window of time used by the global speaker clustering function 210 can expand to include more than two local windows over time. As a result, the global speaker clustering function 210 can process the embedding vectors corresponding to audio data 202 received in a first global window, process the embedding vectors corresponding to audio data 202 received in a second global window that includes the first global window, and so on. One example of this type of approach for global clustering is shown in FIG. 4, which is described in more detail below.

In this example, the local speaker clustering function 208 is used to produce partial diarization results 212, and the global speaker clustering function 210 is used to produce finalized diarization results 214. The partial diarization results 212 represent diarization results produced using clustering in the local windows by the local speaker clustering function 208. These results 212 can typically be generated relatively quickly and are useful for stream-ability or other purposes that involve rapid diarization. However, the results 212 may be less accurate than the finalized diarization results 214, since the finalized diarization results 214 represent diarization results produced using clustering in the larger global windows by the global speaker clustering function 210. As a result, in some cases, the partial diarization results 212 may be output for use (such as for immediate display) and can later be overwritten by the finalized diarization results 214 (since the finalized diarization results 214 may replace some of the results contained in the partial diarization results 212). In this way, the architecture 200 can use local clustering to satisfy desired latency requirements and use global clustering to satisfy desired accuracy requirements.

In some embodiments, each of the speaker clustering functions 208 and 210 represents a trained machine learning model, such as a CNN, DNN, or other machine learning model. Using suitable training data (such as training embedding vectors associated with known speakers), the machine learning models can be trained to cluster the training embedding vectors and identify clusters of embedding vectors associated with the known speakers. The trained machine learning models can be used to cluster the embedding vectors generated using the audio data 202 in order to identify different speakers within the audio data 202.

It should be noted that the functions shown in or described with respect to FIG. 2 can be implemented in an electronic device 101, server 106, or other device(s) in any suitable manner. For example, in some embodiments, at least some of the functions shown in or described with respect to FIG. 2 can be implemented or supported using one or more software applications or other software instructions that are executed by the processor(s) 120 of the electronic device 101, server 106, and/or other device. In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions. Also, the functions shown in or described with respect to FIG. 2 can be performed by a single device or by multiple devices. In some cases, for instance, the functions shown in or described with respect to FIG. 2 can be performed by the electronic device 101, and the diarization results 212-214 may be displayed or otherwise used by the electronic device 101 in any suitable manner. In other cases, the electronic device 101 may obtain and provide the audio data 202 to the server 106 for processing, and the server 106 may provide the diarization results 212-214 to the electronic device 101 or other suitable destination(s) or may use the diarization results 212-214 in any suitable manner. In general, this disclosure is not limited to any specific physical implementation of the architecture 200.

Although FIG. 2 illustrates one example of an architecture 200 for online speaker diarization using local clustering and global clustering, various changes may be made to FIG. 2. For example, various components shown in FIG. 2 can be added, omitted, combined, further subdivided, replicated, or placed in any other suitable configuration according to particular needs.

FIG. 3 illustrates an example of local clustering 300 in the architecture 200 of FIG. 2 in accordance with this disclosure. In particular, FIG. 3 illustrates one example of how the local speaker clustering function 208 may cluster and process embedding vectors generated using the audio data 202. For ease of explanation, the local clustering 300 is described as being performed by the electronic device 101, server 106, or other device(s) in the network configuration 100 of FIG. 1. However, the local clustering 300 may be performed by any other suitable device(s) and in any other suitable system(s).

As shown in FIG. 3, the local clustering 300 involves the processing of audio data 302, which may be received and processed in real-time or in any other suitable manner. The audio data 302 may represent portions or all of the audio data 202, such as when the audio data 302 represents the audio data 202 in which speech activity was detected by the speech activity detection function 204. Here, the audio data 302 is divided into segments 304, where each segment 304 contains some form of detected speech activity by one or more speakers. Each segment 304 of the audio data 302 may have any suitable duration, such as a duration of about one second to about one and a half seconds (although other durations are possible). Each segment 304 of the audio data 302 is converted by the speaker embedding extraction function 206 into a corresponding embedding vector 306, such as a feature vector.

The local speaker clustering function 208 defines a first local window 308, which represents a period of time associated with a first smaller collection of the segments 304. The local speaker clustering function 208 performs monotonically-increasing chunk-based spectral clustering or other local clustering of the embedding vectors 306 within the first local window 308 in this example. Thus, for instance, the local speaker clustering function 208 can perform local clustering for a first subset 310 of the embedding vectors 306 within the first local window 308. Using the first subset 310, the local speaker clustering function 208 clusters the embedding vectors 306 and attempts to identify different speakers that are associated with different clusters of the embedding vectors 306. When one or more additional embedding vectors 306 become available, the local speaker clustering function 208 can perform local clustering for a second subset 312 of the embedding vectors 306 within the first local window 308, where the second subset 312 includes the embedding vectors 306 of the first subset 310 and at least one additional embedding vector 306. Using the second subset 312, the local speaker clustering function 208 again clusters the embedding vectors 306 and attempts to identify different speakers that are associated with different clusters of the embedding vectors 306. When one or more additional embedding vectors 306 become available, the local speaker clustering function 208 can perform local clustering for a third subset 314 of the embedding vectors 306 within the first local window 308, where the third subset 314 includes the embedding vectors 306 of the first and second subsets 310, 312 and at least one additional embedding vector 306. Using the third subset 314, the local speaker clustering function 208 again clusters the embedding vectors 306 and attempts to identify different speakers that are associated with different clusters of the embedding vectors 306. This process can continue until all embedding vectors 306 for all segments 304 of the audio data 302 within the first local window 308 are processed. At this point, the processing of the embedding vectors 306 for the first local window is completed.

The time window used by the local speaker clustering function 208 is shifted to define a second local window 316, and the same type of processing shown for the first local window 308 may be performed in the second local window 316 (but with a different collection of embedding vectors 306 for a different collection of segments 304). All segments 304 of the audio data 302 within the second local window 316 can be processed in this manner, and at that point the processing of the embedding vectors 306 for the second local window 316 is completed. The time window used by the local speaker clustering function 208 is shifted again to define a third local window 318, and the same type of processing shown for the first local window 308 may be performed in the third local window 318 (with a different collection of embedding vectors 306 for a different collection of segments 304). This process can continue over the duration of the audio data 302.

The results of the clustering in each local window 308, 316, 318 can be used to identify a listing or sequence of speaker identities in each local window 308, 316, 318. Thus, for example, the architecture 200 may identify and output a sequence of speaker identities in which different speakers are identified as saying different things within each local window 308, 316, 318. In some cases, the sequence of speaker identities may be generated and output after the first subset 310 of the embedding vectors 306 within the first local window 308 is processed. Since speaker diarization typically becomes more accurate as more data is processed, an updated sequence of speaker identities (which may or may not match the original sequence of speaker identities) may be generated and output after the second subset 312 of the embedding vectors 306 within the first local window 308 is processed. Similarly, another updated sequence of speaker identities (which may or may not match the prior sequences of speaker identities) may be generated and output after the third subset 314 of the embedding vectors 306 within the first local window 308 is processed. In some embodiments, this allows results to be presented in real-time or near-real-time and then updated (if needed).

Note that the local windows 308, 316, 318 can each have any suitable duration, and the time window used by the local speaker clustering function 208 to define the local windows 308, 316, 318 can be shifted by any suitable amount to define adjacent local windows. For example, in some instances, each local window 308, 316, 318 may have a duration of five minutes, and the time window used to define the local windows may be shifted by three minutes. In this case, the first time window 308 may span a time period from t to t+5, the second time window 316 may span a time period from t+3 to t+8, and the third time window 318 may span a time period from t+6 to t+11. As a result, two adjacent local windows may overlap for a period of two minutes. However, other durations, shift amounts, and overlap amounts may be used here.

FIG. 4 illustrates an example of global clustering 400 in the architecture 200 of FIG. 2 in accordance with this disclosure. In particular, FIG. 4 illustrates one example of how the global speaker clustering function 210 may cluster and process embedding vectors generated using the audio data 202. For ease of explanation, the global clustering 400 is described as being performed by the electronic device 101, server 106, or other device(s) in the network configuration 100 of FIG. 1. However, the global clustering 400 may be performed by any other suitable device(s) and in any other suitable system(s).

As shown in FIG. 4, the local windows 308, 316, 318 used by the local speaker clustering function 208 are shown. Different local windows 308, 316, 318 can be associated with different subsets of the segments 304 of the audio data 302, and the local windows 308, 316, 318 (and therefore their associated subsets of segments 304) can overlap with one another.

The global speaker clustering function 210 defines a first global window 402, which represents a period of time associated with a first larger set of the segments 304. In some cases, the first global window 402 can include more than one of the local windows. In this particular example, the first global window 402 encompasses two of the local windows 308, 316. The global speaker clustering function 210 can perform global spectral clustering or other global clustering of the embedding vectors 306 within the first global window 402. Thus, for instance, the global speaker clustering function 210 can perform global clustering for a first set 404 of the embedding vectors 306, which could be the same embedding vectors 306 processed by the local speaker clustering function 208 during the local windows 308, 316. Using the first set 404 of the embedding vectors 306, the global speaker clustering function 210 clusters the embedding vectors 306 and attempts to identify different speakers that are associated with different clusters of the embedding vectors 306.

The global speaker clustering function 210 also defines a second global window 406, which is longer than and includes the first global window 402 (and therefore is associated with a second even larger set of the segments 304). The global speaker clustering function 210 can perform global spectral clustering or other global clustering of the embedding vectors 306 within the second global window 406. Thus, for instance, the global speaker clustering function 210 can perform global clustering for a second set 408 of the embedding vectors 306, which could be the same embedding vectors 306 processed by the local speaker clustering function 208 during the local windows 308, 316, 318 (and which includes the embedding vectors 306 of the first set 404). Using the second set 408 of the embedding vectors 306, the global speaker clustering function 210 clusters the embedding vectors 306 and attempts to identify different speakers that are associated with different clusters of the embedding vectors 306. This process can continue over the duration of the audio data 302.

For each global window 402, 406, the global speaker clustering function 210 can cluster the embedding vectors 306 and attempt to identify different speakers that are associated with different clusters of the embedding vectors 306. The results of the clustering in each global window 402, 406 can be used to identify a listing or sequence of speaker identities in each global window 402, 406. Thus, for example, the architecture 200 may identify and output a sequence of speaker identities in which different speakers are identified as saying different things within each global window 402, 406. In some cases, the sequence of speaker identities may be generated and output after the embedding vectors 306 within the first global window 402 are processed. Since speaker diarization typically becomes more accurate as more data is processed, an updated sequence of speaker identities (which may or may not match the original sequence of speaker identities) may be generated and output after the embedding vectors 306 within the second global window 406 are processed.

Each global window 402, 406 here may have any suitable duration. For example, in some cases, the first global window 402 may have a duration of twenty minutes. The duration of the global window may gradually expand as more and more audio data 302 is received so that the global window encompasses the period from the start of the first global window 402 to the current time. In some cases, this can occur in defined steps, such as when the second global window 406 is five, ten, fifteen, or twenty minutes longer than the first global window 402 and each subsequent global window is five, ten, fifteen, or twenty minutes longer than the previous global window. The final global window may span the entire length of the audio data 302.

Note that portions of the processing during the local clustering 300 can occur sequentially or in parallel. For example, the clustering of embedding vectors 306 in one local window may complete before the clustering of embedding vectors 306 in the next local window starts, or the clustering of embedding vectors 306 in multiple local windows may overlap with one another. Similarly, portions of the processing during the global clustering 400 can occur sequentially or in parallel. For instance, the clustering of embedding vectors 306 in one global window may complete before the clustering of embedding vectors 306 in the next global window starts, or the clustering of embedding vectors 306 in multiple global windows may overlap with one another. In addition, portions of the processing during the local clustering 300 and the global clustering 400 can occur sequentially or in parallel. For example, the clustering of embedding vectors in one or more local windows may complete before the clustering of embedding vectors in a global window starts, or the clustering of embedding vectors 306 in the local and global windows may overlap. In some cases, the parallel performance of local and global clustering can help to speed up generation of the finalized diarization results 214.

Although FIGS. 3 and 4 illustrate examples of local clustering and global clustering in the architecture 200 of FIG. 2, various changes may be made to FIGS. 3 and 4. For example, the number of embedding vectors 306 in each subset processed within a local window can vary, and the number of local windows and the length of each local window can vary. Similarly, the number of embedding vectors 306 in each set processed within a global window can vary, and the number of global windows and the length of each global window can vary.

Figure 5:
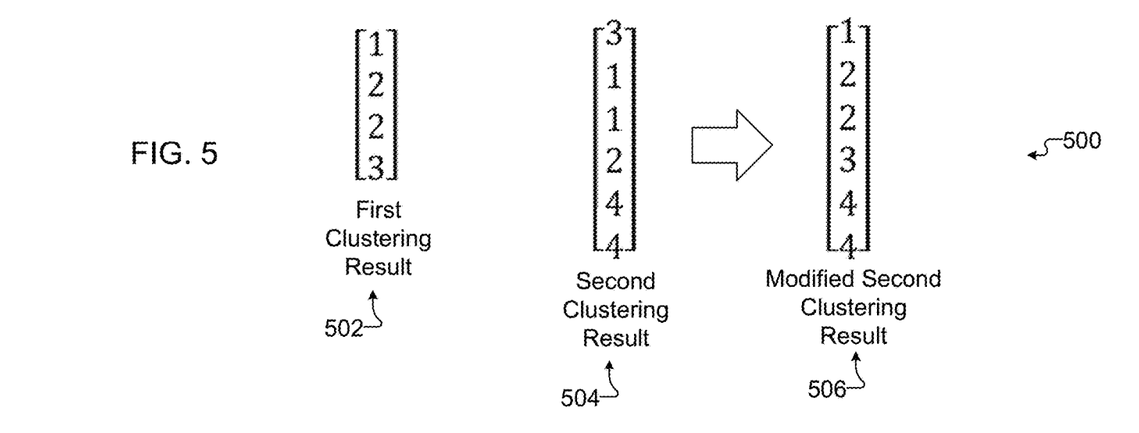
FIG. 5 illustrates an example process for assigning speaker identities to compensate for clustering permutations in accordance with this disclosure.

FIG. 5 illustrates an example process 500 for assigning speaker identities to compensate for clustering permutations in accordance with this disclosure. For ease of explanation, the process 500 is described as being used by the electronic device 101, server 106, or other device(s) in the network configuration 100 of FIG. 1. However, the process 500 may be used by any other suitable device(s) and in any other suitable system(s).

One issue that can arise from the use of clustering algorithms (either local or global clustering algorithms) is the inconsistent use of identifiers for identified clusters. For example, clustering algorithms that can potentially cluster embedding vectors into k clusters may use k different cluster identifiers to represent the clusters, but the cluster identifiers may be assigned inconsistently during different clustering operations. An example of this is shown in FIG. 5, where first results 502 show speaker identifiers for a first clustering operation and second results 504 show speaker identifiers for a second clustering operation that includes the same embedding vectors as the first clustering operation. As can be seen here, a speaker identifier of "1" in the first results 502 has been replaced by a speaker identifier of "3" in the second results 504, a speaker identifier of "2" in the first results 502 has been replaced by a speaker identifier of "1" in the second results 504, and a speaker identifier of "3" in the first results 502 has been replaced by a speaker identifier of "2" in the second results 504. The clusters of embedding vectors involving these three speakers can be the same in both clustering operations, but the identifiers assigned to the speakers are different.

To help compensate for this, entries in a prior sequence of speaker identities can be matched to a portion of entries in a subsequent sequence of speaker identities. In some cases, this can be done based on timestamps associated with the segments 304 of the audio data 302 used to generate the embedding vectors 306. Once the portion of the entries in the subsequent sequence of speaker identities are matched to the entries in the prior sequence of speaker identities, the matched entries in the subsequent sequence of speaker identities are replaced by the corresponding entries in the prior sequence of speaker identities. In FIG. 5, this involves determining that the first four entries in the second results 504 correspond to the four entries in the first results 502, which could involve matching the timestamps of the entries in the first and second results 502, 504. Once matched, the four entries in the second results 504 are replaced by the corresponding entries in the first results 502, leading to the generation of modified second clustering results 506. Although not shown here, other entries of the second results 504 (such as additional entries added to the second results 504 and not contained in the first results 502) may be updated in order to ensure that consistent identifiers are used to represent the same speakers in different clustering operations. This allows consistent speaker identifiers to be used across all local and global clustering operations performed in the architecture 200.

Although FIG. 5 illustrates one example of a process 500 for assigning speaker identities to compensate for clustering permutations, various changes may be made to FIG. 5. For example, the specific speaker identifiers shown here are for illustration only. Also, while the process 500 represents one approach for resolving inconsistent speaker identifiers across different clustering operations, other approaches may also be used. For instance, in global clustering operations, speaker identifiers can be assigned sequentially to clusters of embedding vectors based on the order in which the speakers first appear in the audio data 202. Since each subsequent global clustering operation may include the same embedding vectors 306 used in the prior global clustering operation(s), this approach can help to achieve the use of consistent speaker identifiers across the global clustering operations.

Another approach that may be used for local and global clustering operations involves comparing the clustered vectors for each speaker after a local or global clustering operation is performed to the clustered vectors for each speaker produced during at least one prior local or global clustering operation. Cosine similarity values or other similarity values may be used to determine whether clustered vectors produced during different local or global clustering operations relate to the same speaker. As a particular example of this, an average or other speaker vector may be produced for each speaker based on that speaker's cluster of embedding vectors 306 for a completed local or global clustering operation. During a subsequent local or global clustering operation, cosine similarity values or other similarity values may be determined between centroids of clusters of embedding vectors 306 produced during the subsequent local or global clustering operation and the speaker vectors from at least one prior local or global clustering operation. If a similarity value is larger than a specified threshold (such as 0.65), the cluster identifier for the subsequent local or global clustering operation can be assigned to match the same identifier as used in the prior local or global clustering operation.

Figure 6:
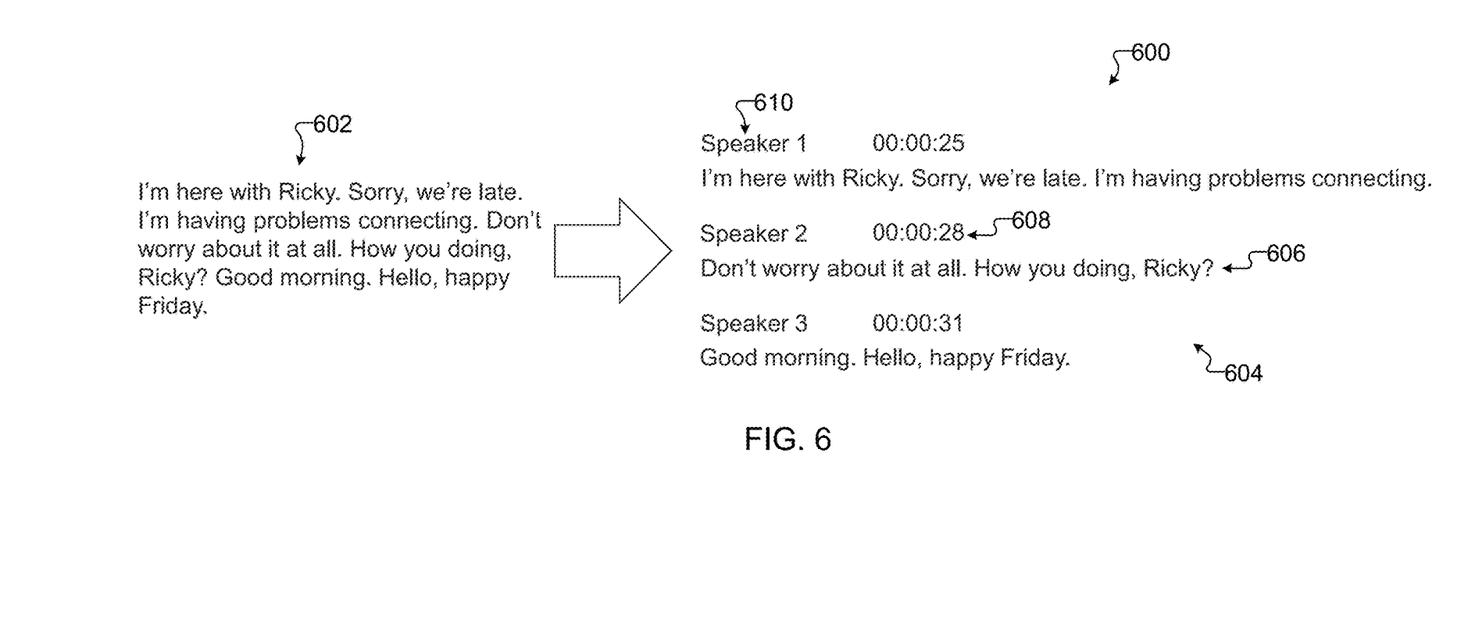
FIG. 6 illustrates example results obtained with online speaker diarization using local clustering and global clustering in accordance with this disclosure.

FIG. 6 illustrates example results 600 obtained with online speaker diarization using local clustering and global clustering in accordance with this disclosure. The results 600 may, for example, be obtained by an electronic device 101, server 106, or other device implementing the architecture 200 shown in FIG. 2. However, the same type of results may be obtained by any other suitable device(s) and in any other suitable system(s).

As shown in FIG. 6, input audio data 602 is received and processed to produce a transcript 604. The audio data 602 includes speech containing words spoken by multiple people, and the transcript 604 includes the same words but breaks down who said what during the conversation. In this example, the transcript 604 includes multiple entries, where each entry includes a portion 606 of the spoken content from the audio data 602. Each entry also includes a timestamp 608, which in some cases may identify when the associated portion 606 of the spoken content begins in the audio data 602. Each entry further includes a speaker label 610, which may be produced by the architecture 200. Each speaker label 610 provides an identification of the speaker determined to be speaking the associated portion 606 of the spoken content in the audio data 602.

In this example, the speaker labels 610 are given generic labels, namely "Speaker 1," "Speaker 2," and "Speaker 3." However, other labels may be used, such as the actual names of the speakers. The names or other labels 610 used to identify the speakers may be determined in any suitable manner. In some cases, for instance, at least one user may provide an identification of each of one or more speakers at one or more locations within the transcript 604, and the label for each speaker can be updated within the transcript 604 (possibly throughout the transcript). As another example, natural language processing, automatic speech recognition, or other techniques may be used to identify labels for the speakers based on the contents of the audio data 602 itself, such as when one speaker directs a question to a named individual and another speaker (presumably the named individual) answers the question. As yet another example, actual speaker names or other labels may be assigned using a speaker verification technique based on speaker vector similarities (such as those based on cosine similarity values). Here, if speaker vectors generated from speakers' prior utterances are available (such as from prior speaker enrollments where speakers say certain words or phrases like "Hi BIXBY" during voice assistant enrollment), it is possible to determine speaker similarities, such as by determining the similarities between the centroids of clusters being processed and clusters of already-enrolled speaker vectors. In general, any suitable technique may be used to identify generic or customized labels for speakers captured in the audio data 602.

The transcript 604, speaker labels 610, or other information here may be further processed for use in any desired manner. For example, the transcript 604 may be displayed (possibly in real-time) for use in streaming media services, closed-caption systems, or other systems. The transcript 604 may be processed to provide conversation analysis based on who said what during a conversation. The transcript 604 and the audio data 202 (and possibly other data like video data) may be stored, and the transcript 604 may be subsequently searched based on a user query to determine if the audio data 202 (and possibly the other data) should be provided in response to the query. In general, the transcript 604, speaker labels 610, or other information here may be used in any suitable manner.

Although FIG. 6 illustrates one example of results 600 obtained with online speaker diarization using local clustering and global clustering, various changes may be made to FIG. 6. For example, the actual audio contents of the audio data can vary widely, and FIG. 6 does not limit the scope of this disclosure to any particular type of audio contents. In general, online speaker diarization may be used with any suitable audio data containing speech activity, and results of the online speaker diarization may be used in any number of ways.

Figure 7:
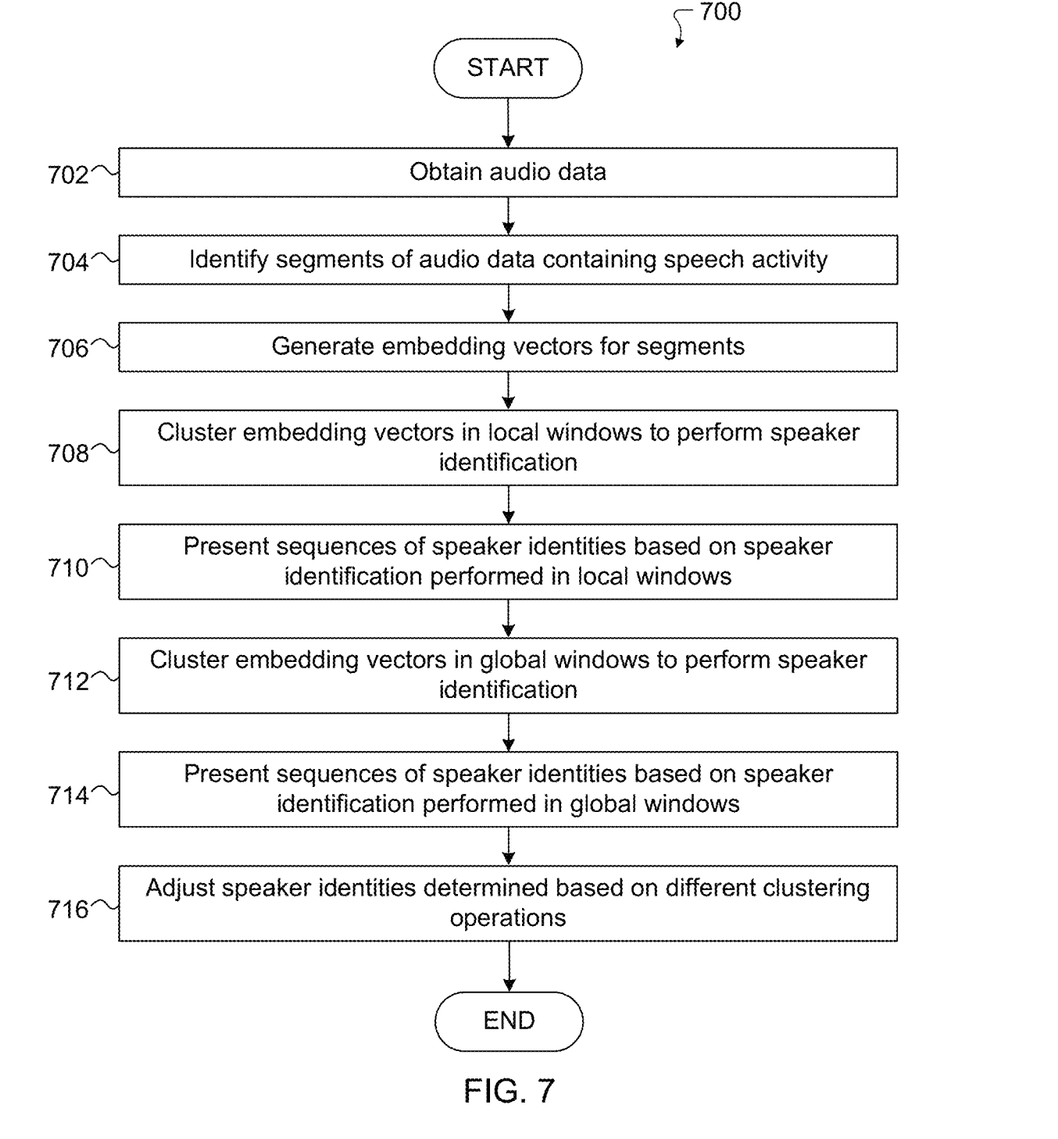
FIG. 7 illustrates an example method for online speaker diarization using local clustering and global clustering in accordance with this disclosure.

FIG. 7 illustrates an example method 700 for online speaker diarization using local clustering and global clustering in accordance with this disclosure. For ease of explanation, the method 700 is described as being performed by the electronic device 101, server 106, or other device(s) in the network configuration 100 of FIG. 1. However, the method 700 may be performed by any other suitable device (s) and in any other suitable system(s).

As shown in FIG. 7, audio data is obtained at step 702, and segments of the audio data containing speech activity are identified at step 704. This may include, for example, the processor 120 of the electronic device 101 or server 106 obtaining audio data 202 from any suitable source(s), such as from one or more microphones of the electronic device 101 or other device. This may also include the processor 120 of the electronic device 101 or server 106 performing the speech activity detection function 204 to identify segments 304 of the audio data containing speech activity. Embedding vectors for the segments of audio data are generated at step 706. This may include, for example, the processor 120 of the electronic device 101 or server 106 performing the speaker embedding extraction function 206 to generate feature vectors or other embedding vectors 306 representing the segments 304.

The embedding vectors in multiple local windows are clustered to perform speaker identification at step 708, and one or more sequences of speaker identities are presented based on the speaker identification performed in one or more of the local windows at step 710. This may include, for example, the processor 120 of the electronic device 101 or server 106 performing the local speaker clustering function 208 to cluster the embedding vectors 306 generated for segments 304 received within various local windows 308, 316, 318. This may also include the processor 120 of the electronic device 101 or server 106 generating and outputting partial diarization results 212 based on the local clustering operations. The local windows here can include windows that partially overlap one another.

The embedding vectors in multiple global windows are clustered to perform speaker identification at step 712, and one or more sequences of speaker identities are presented based on the speaker identification performed in one or more of the global windows at step 714. This may include, for example, the processor 120 of the electronic device 101 or server 106 performing the global speaker clustering function 210 to cluster the embedding vectors 306 generated for segments 304 received within various global windows 402, 406. This may also include the processor 120 of the electronic device 101 or server 106 generating and outputting finalized diarization results 214 based on the global clustering operations. The global windows here can include at least one global window that includes (but is larger than) another global window.

Speaker identities as determined based on different ones of the clustering operations can be adjusted for consistency (if needed) at step 716. This may include, for example, the processor 120 of the electronic device 101 or server 106 performing the process 500 as shown in FIG. 5 or using another technique to ensure that speaker identities generated in different local or global clustering operations are consistently referring to the same speakers. As a particular example, this may include the processor 120 of the electronic device 101 or server 106 matching entries in a first sequence of speaker identities (results 502) to a portion of entries in a second sequence of speaker identities (results 504), which in some cases may be based on timestamps. This may also include the processor 120 of the electronic device 101 or server 106 replacing the portion of the entries in the second sequence of speaker identities with the entries in the first sequence of speaker identities and possibly updating new entries in the second sequence of speaker identities to produce a modified sequence of speaker identities (results 506).

Although FIG. 7 illustrates one example of a method 700 for online speaker diarization using local clustering and global clustering, various changes may be made to FIG. 7. For example, while shown as a series of steps, various steps in FIG. 7 may overlap, occur in parallel, occur in a different order, or occur any number of times. As a particular example, steps 704-706 may occur repeatedly as more and more audio data 202 is received and processed. While these steps 704-706 are occurring, steps 708-716 may occur so that the clustering of the embedding vectors 306 and the presentation of the speaker identities can be performed as the embedding vectors 306 are generated.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method for performing online speaker diarization, the method comprising:
obtaining at least a portion of an audio stream containing speech activity, at least the portion of the audio stream comprising multiple segments;
for each of the multiple segments, generating an embedding vector that represents the segment;
within each of multiple local windows, performing monotonically-increasing chunk-based spectral clustering of the embedding vectors into one or more clusters to perform speaker identification, wherein different clusters correspond to different speakers, each local window having more than one of the segments;
presenting at least one first sequence of speaker identities based on the speaker identification performed for the local windows;
within each of multiple global windows, clustering the embedding vectors into one or more clusters to perform speaker identification, wherein each global window includes two or more of the local windows; and
presenting at least one second sequence of speaker identities based on the speaker identification performed for the global windows;
wherein performing the monotonically-increasing chunk-based spectral clustering comprises clustering different subsets of the embedding vectors in the local window such that each subsequent subset includes (i) the embedding vectors of at least one prior subset and (ii) at least one additional embedding vector not included in the at least one prior subset.

2. The method of claim 1, further comprising:
matching entries in different sequences of speaker identities; and
replacing at least some of the entries in one sequence of speaker identities with at least some of the entries in another sequence of speaker identities so that clusters generated in different windows correspond to common speakers.

3. The method of claim 1, wherein the local windows partially overlap one another.

4. The method of claim 1, wherein:
the global windows comprise first and second global windows; and
the second global window is larger than and includes the first global window.

5. The method of claim 1, wherein a final one of the global windows encompasses an entirety of the audio stream.

6. The method of claim 1, further comprising:
determining a similarity between clusters of the embedding vectors in different ones of the local windows; and
in response to determining that the similarity exceeds a threshold, using a common cluster identifier for the clusters of the embedding vectors in the different local windows.

7. An apparatus comprising:
at least one processing device configured to:
obtain at least a portion of an audio stream containing speech activity, at least the portion of the audio stream comprising multiple segments;
for each of the multiple segments, generate an embedding vector that represents the segment;
within each of multiple local windows, perform monotonically-increasing chunk-based spectral clustering of the embedding vectors into one or more clusters to perform speaker identification, wherein different clusters correspond to different speakers, each local window having more than one of the segments;
initiate presentation of at least one first sequence of speaker identities based on the speaker identification performed for the local windows;
within each of multiple global windows, cluster the embedding vectors into one or more clusters to perform speaker identification, wherein each global window includes two or more of the local windows; and
initiate presentation of at least one second sequence of speaker identities based on the speaker identification performed for the global windows;
wherein, to perform the monotonically-increasing chunk-based spectral clustering, the at least one processing device is configured to cluster different subsets of the embedding vectors in the local window such that each subsequent subset includes (i) the embedding vectors of at least one prior subset and (ii) at least one additional embedding vector not included in the at least one prior subset.

8. The apparatus of claim 7, wherein the at least one processing device is further configured to:
match entries in different sequences of speaker identities; and
replace at least some of the entries in one sequence of speaker identities with at least some of the entries in another sequence of speaker identities so that clusters generated in different windows correspond to common speakers.

9. The apparatus of claim 7, wherein the local windows partially overlap one another.

10. The apparatus of claim 7, wherein:
the global windows comprise first and second global windows; and
the second global window is larger than and includes the first global window.

11. The apparatus of claim 7, wherein a final one of the global windows encompasses an entirety of the audio stream.

12. The apparatus of claim 7, wherein the at least one processing device is further configured to:
determine a similarity between clusters of the embedding vectors in different ones of the local windows; and
in response to determining that the similarity exceeds a threshold, use a common cluster identifier for the clusters of the embedding vectors in the different local windows.

13. A non-transitory computer readable medium containing instructions that when executed cause at least one processor to:
obtain at least a portion of an audio stream containing speech activity, at least the portion of the audio stream comprising multiple segments;
for each of the multiple segments, generate an embedding vector that represents the segment;
within each of multiple local windows, perform monotonically-increasing chunk-based spectral clustering of the embedding vectors into one or more clusters to perform speaker identification, wherein different clusters correspond to different speakers, each local window having more than one of the segments;
initiate presentation of at least one first sequence of speaker identities based on the speaker identification performed for the local windows;
within each of multiple global windows, cluster the embedding vectors into one or more clusters to perform speaker identification, wherein each global window includes two or more of the local windows; and initiate presentation of at least one second sequence of speaker identities based on the speaker identification performed for the global windows;

wherein the instructions that when executed cause the at least one processor to perform the monotonically-increasing chunk-based spectral clustering comprise instructions that when executed cause the at least one processor to cluster different subsets of the embedding vectors in the local window such that each subsequent subset includes (i) the embedding vectors of at least one prior subset and (ii) at least one additional embedding vector not included in the at least one prior subset.

14. The non-transitory computer readable medium of claim 13, further containing instructions that when executed cause the at least one processor to:

match entries in different sequences of speaker identities; and replace at least some of the entries in one sequence of speaker identities with at least some of the entries in another sequence of speaker identities so that clusters generated in different windows correspond to common speakers.

15. The non-transitory computer readable medium of claim 13, wherein the local windows partially overlap one another.

16. The non-transitory computer readable medium of claim 13, wherein:

the global windows comprise first and second global windows; and the second global window is larger than and includes the first global window.

17. The non-transitory computer readable medium of claim 13, further containing instructions that when executed cause the at least one processor to:

determine a similarity between clusters of the embedding vectors in different ones of the local windows; and in response to determining that the similarity exceeds a threshold, use a common cluster identifier for the clusters of the embedding vectors in the different local windows.

18. The method of claim 1, wherein portions of processing during the clustering of the embedding vectors in the local windows and portions of processing during the clustering of the embedding vectors in the global windows occur in parallel.

19. The apparatus of claim 7, wherein the at least one processing device is configured to perform portions of processing during the clustering of the embedding vectors in the local windows and portions of processing during the clustering of the embedding vectors in the global windows in parallel.

20. The non-transitory computer readable medium of claim 13, wherein the instructions when executed cause the at least one processor to perform portions of processing during the clustering of the embedding vectors in the local windows and portions of processing during the clustering of the embedding vectors in the global windows in parallel.

* * * * *